3,097,041
PROCESS FOR DYEING WITH REACTIVE DYES IN WATER-SOLUBLE THIOL COMPOUND

Gordon Hobson Lister, 152 Canal Road, Bradford 2, England, and Hermann Egli, 47 Aralienstrasse, Basel, Switzerland
No Drawing. Filed June 27, 1960, Ser. No. 38,761
Claims priority, application Switzerland June 26, 1959
7 Claims. (Cl. 8—54)

This invention relates to a process for dyeing keratin-containing fibers, e.g. sheep's and goat's wool, with reactive dyestuffs. The process consists in treating the fibers during dyeing, with reducing compounds which are capable of splitting the cystine bridges of keratin into one or two SH groups.

A compound of this type is e.g.

$$HS—R—COOH \qquad (I)$$

wherein R represents a divalent hydrocarbon radical.

The Compound I can be of araliphatic, cycloaliphatic, or preferably of aromatic or aliphatic nature, e.g. thioglycolic acid, α- or β-mercaptopropionic acid, mercaptobutyric acid, mercaptoisobutyric acid, α-mercaptovaleric acid, mercaptosuccinic acid, or 3- or 4-mercaptobenzoic acid. It is employed as the free acid or in the form of one of its water-soluble salts, e.g. an earth alkali metal, alkali metal, ammonium or amino salt.

The compound of Formula I is advantageously employed in amounts of 1% to 20% by weight of the goods in the dyebath itself. The bath in which it is used must also contain an inorganic or organic acid, e.g. sulphuric, phosphoric, acetic or formic acid, or the ammonium salt of such an acid. Esters, e.g. glycol diacetate, are also suitable as acid donors. At the end of the dyeing process the pH value of the dyebath is adjusted to 7–7.5 by the addition of an alkali or an alkali donor, e.g. ammonia, urotropine, or a buffer mixture, and the dyeing is after treated in the bath with heating and, if desired in presence of ions of a heavy metal such as chromium, nickel, manganese, cobalt, iron or copper.

The reactive dyestuffs suitable for the process are those containing at least one reactive group which possesses at least one substituent which can be easily split off as an anion.

The preferred reactive group of this type is the radical of an acid containing at least one mobile halogen atom, e.g. chloroacetic acid, bromoacetic acid, β-chloro- or β-bromopropionic acid, α-chloro-, β-chloro, α-bromo- or β-bromoacrylic acid, α-, β- or β,β-dichloro- or -dibromoacrylic acid, trichloro- or tribromoacrylic acid, α-, β-, γ-chlorocrotonic acid, α-, β-, γ-bromocrotonic acid, α,β-dichlorocrotonic acid, monochloro- or monobromomaleic acid, dichloro- or dibromomaleic acid, monochloro- or monobromofumaric acid, dichloro- or dibromofumaric acid, dichloro-or dibromofumaric acid, dichloro- or dibromosuccinic acid, or the radical of one of the following heterocyclic compounds: cyanuric chloride, cyanuric bromide, primary condensation products of the cyanuric chloride of the composition:

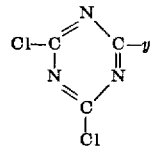

wherein y represents the radical, which may contain further substituents, or a primary or secondary aliphatic, alicyclic, aromatic or heterocyclic amine, an aliphatic, alicyclic, aromatic or heterocyclic hydroxy or thiol compound, in particular the radical of aniline its alkyl, sulfonic acid or carboxylic acid derivatives, or of a low molecular mono- or dialkyl amine or ammonia, 2,4,6-trichloropyrimidine, 2,4,6-tribromopyrimidine and their derivatives which may contain the following substituents in the 5-postion: methyl, ethyl, carboxylic acid or sulfonic acid amide which may be substituted on the nitrogen atom, carboxylic acid methyl or ethyl ester, acyl, e.g. acetyl, benzoyl, alkylene, e.g. allyl, substituted alkyl, e.g. 2-ketopropyl, carboxymethyl, chloro- or bromomethyl, a methylene group between two pyrimidine nuclei, 2,4,5,6-tetrachloro- or tetrabromopyrimidine, 2,6-dichloro- or -dibromopyrimidine-4-carboxylic acid ethyl ester, 2,4,5-trichloro-pyrimidine, 4- or 5-carboxylic acid amide or sulfonic acid amide derivatives of 2,6-dichloro- or -dibromopyrimidine which may be substituted on the nitrogen atom, 2,5,6-trichloro-4-methylpyrimidine or 2,6-dichloro-4-trichloromethylpyrimidine.

The dyeings obtained possess excellent wet fastness properties (water, washing, milling, perspiration and rubbing fastness) and very good stability to dry cleaning. Acetate, triacetate or polyethylene terephthalate fibers which are present in the dyebath are reserved.

In the following examples the parts and percentages are by weight and the temperatures in degrees centigrade.

Example 1

100 parts of wool in hank form are placed in a dyeing machine with circulating liquor flow. 2000 parts of water, 2 parts of 80% acetic acid, 0.5 part of the condensation product of 1 mole of oleylamine and 8 moles of ethylene oxide, and 5 parts of ammonium thioglycolate are added. The dyebath is rapidly heated to 50° and maintained at this temperature for 5 minutes. After the addition of 2 parts of the reactive dyestuff, produced by condensation of 1 mol of 2,4,6-trichloropyrimidine with 1 mole of 1-hydroxy-2-phenylazo-8-aminonaphthalene-2,3,6-trisulfonic acid, the temperature is raised to 98° in 30 minutes and this temperature maintained for 1 hour. The dyebath is then neutralized by the addition of 5 parts of hexamethylene tetramine and boiled for a further 20 minutes. The dyed goods are subsequently rinsed and dried. The red dyeing thus produced possesses very good wet fastness properties.

Equally good results are obtained when the above-mentioned dyestuff is replaced by one of the following dyestuffs: the condensation product of 1 mole of 2,4,6-trichloropyrimidine and 1 mole of 1-hydroxy-2-(4'-methyl)-phenylazo-8-aminonaphthalene-2',3,6-trisulfonic acid or 1 mole of 1-(2',5'-dichloro)-phenyl-3-methyl-4-(3''-amino)-phenylazo-5-pyrazolone-4',6''-disulfonic acid or the condensation product of 1 mole of tetrachloropyrimidine and 1 mole of copper phthalocyanine sulfonic acid-(3'-amino)-phenylamide-trisulfonic acid, or 1 mole of 1-amino-4-(3'-amino)-phenylaminoanthraquinone - 2,4-disulfonic acid or 1 mole of 1-amino-4-(2',4',6'-trimethyl-3'-amino) - phenylamino - anthraquinone - 2,6-disulfonic acid.

Ammonium thioglycolate can be replaced by an equivalent amount of α- or β-mercaptopropionic acid, mercaptobutyric acid, mercapto-isobutyric-4-mercaptobenzoic acid or their ammonium salts.

Example 2

100 parts of scoured loose wool are introduced into a dyebath of 2000 parts of water, 2 parts of 80% acetic acid, 1 part of cetyl eicosaglycol ether, 0.3 part of N-stearoylaminopropyl-N,N-di-(n-butyl) - N - benzylammonium chloride, 10 parts of ammonium thioglycolate, and 2 parts of the reactive dyestuff produced by condensation of 1 mole of 2,4,6-trichloropyrimidine with 1 mole of 1-hydroxy-2-(4'-methyl)-phenylazo - 8 - aminonaphthalene- 2′,3,6-trisulfonic acid. From the starting temperature of 50° the dyebath is raised to 98° in 30 minutes and boiling continued for 30 minutes. 0.2 part of manganese chloride are added and the bath boiled for a further 30 minutes. Its pH is then adjusted for 7.5 with the addition of ammonia, and boiling is continued for a further 30 minutes. A red dyeing of high wet fastness is obtained.

*Example 3*

100 parts of scoured loose wool are entered into a dyebath of 2000 parts of water containing 4 parts of thioglycolic acid, 1 part of cetylpyridinium bromide and 2 parts of the reactive dyestuff produced by condensation of 1 mole of 2-phenylamino-4,6-dichloro-1,3,5-triazine-4′-sulfonic acid with 1 mole of 1-amino-4-(3′-amino)-phenylaminoanthraquinone-2,4′-disulfonic acid.

From its initial temperature, 50°, the dyebath is raised to 98° in 30 minutes and dyeing is continued for 1 hour at this temperature. The pH value is then brought to 7.5 by the addition of sodium carbonate, 2 parts of chromium fluoride are added and the dyebath maintained at 100° for a further 30 minutes. A brilliant blue dyeing of high wet fastness is obtained.

Equally good results are obtained when the above-mentioned dyestuff is replaced by one of the following: the condensation product of 1 mole of 2-phenylamino-4,6-dichloro-1,3,5-triazine-3′- or -4′-sulfonic acid and 1 mole of 1-hydroxy-2-(4′-methyl)-phenylazo-8-aminonaphthalene-2′,3,6-trisulfonic acid or 1 mole of 1-(2′,5′-dichloro)-phenyl-3-methyl-4-(3″-amino)-phenylazo-5-pyrazolone-4′,6″-disulfonic acid or the condensation product of 1 mole of 2-phenylamino-4,6-dichloro-1,3,5-triazine-3′-sulfonic acid and 1 mole of copper phthalocyaninesulfonic acid - (3′-amino) - phenylamide-trisulfonic acid, or 1 mole of 1-amino-4-(4′-amino)-phenylaminoanthraquinone-2,3′-disulfonic acid or 1 mole of 1-amino-4 - (2′,4′,6′-trimethyl-3′-amino) - phenylaminoanthraquinone-2,6-disulfonic acid.

Having thus disclosed the invention what we claim is:
1. A process for dyeing keratin-containing fibers with reactive dyestuffs, which consists in
   (1) treating the fibers in aqueous acid medium at a temperature of maximally 100° C. with a reducing compound of the formula

HS—R—COOH wherein R is divalent hydrocarbon radical of 1 to 6 carbons, whereby the cystine bridge of keratin is split into —SH groups, and
   (2) concurrently treating the fibers with a reactive dye selected from the group consisting of azo, anthraquinone and phthalocyanine dyes bearing one to two halogen atoms of an atomic weight between 35 and 81.
2. The process of claim 1 in which thioglycolic acid is the reducing compound.
3. The process of claim 1 in which mercaptopropionic acid is the reducing compound.
4. The process of claim 1 in which mercaptobutyric acid is the reducing compound.
5. The process of claim 1 in which mercaptosuccinic acid is the reducing compound.
6. The process of claim 1 in which 3-mercaptobenzoic acid is the reducing compound.
7. The process of claim 1 in which 4-mercaptobenzoic acid is the reducing compound.

References Cited in the file of this patent
UNITED STATES PATENTS

| | | |
|---|---|---|
| 2,739,033 | Lubs | Mar. 20, 1956 |
| 2,876,781 | Martin | Mar. 10, 1959 |
| 2,933,365 | Moore | Apr. 19, 1960 |
| 2,975,167 | Schwander et al. | May 14, 1961 |

UNITED STATES PATENT OFFICE
CERTIFICATE OF CORRECTION

Patent No. 3,097,041                           July 9, 1963

Gordon Hobson Lister et al.

It is hereby certified that error appears in the above numbered patent requiring correction and that the said Letters Patent should read as corrected below.

In the grant, lines 1 and 2, for "Gordon Hobson Lister, of Bradford, England, and Hermann Egli, of Basel, Switzerland," read -- Gordon Hobson Lister, of Bradford, England, and Hermann Egli, of Basel, Switzerland, assignors to Sandoz Ltd., of Basel, Switzerland, --; line 11, for "Gordon Hobson Lister and Hermann Egli, their heirs" read -- Sandoz Ltd., its successors --; in the heading to the printed specification, lines 4 to 6, for "Gordon Hobson Lister, 152 Canal Road, Bradford 2, England, and Hermann Egli, 47 Aralienstrasse, Basel, Switzerland" read -- Gordon Hobson Lister, Bradford, England, and Hermann Egli, Basel, Switzerland, assignors to Sandoz Ltd., Basel, Switzerland --.

Signed and sealed this 26th day of May 1964.

(SEAL)
Attest:

ERNEST W. SWIDER                               EDWARD J. BRENNER
Attesting Officer                               Commissioner of Patents